Patented Feb. 24, 1942

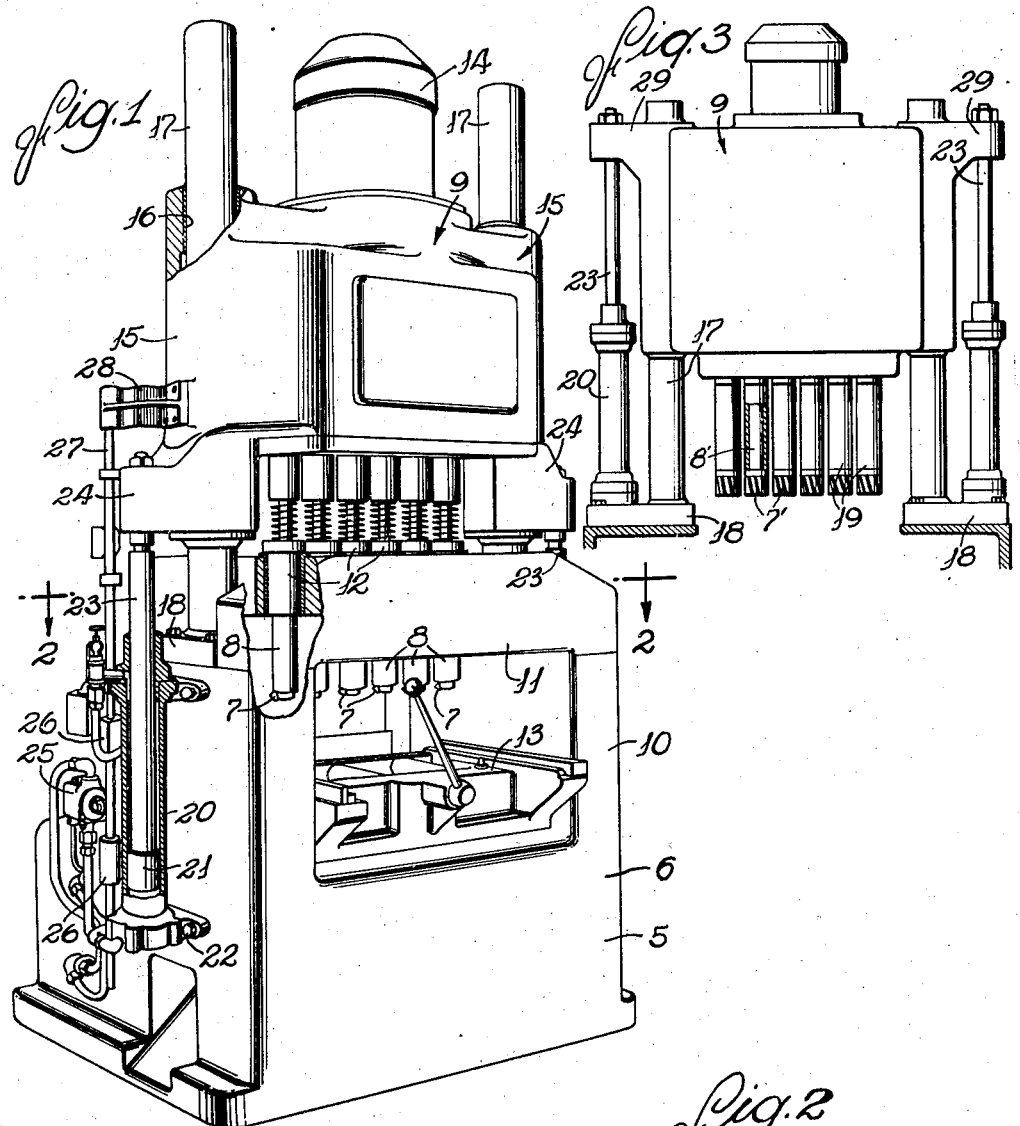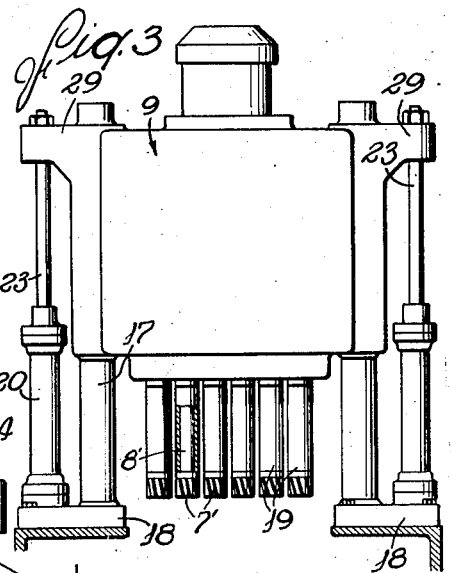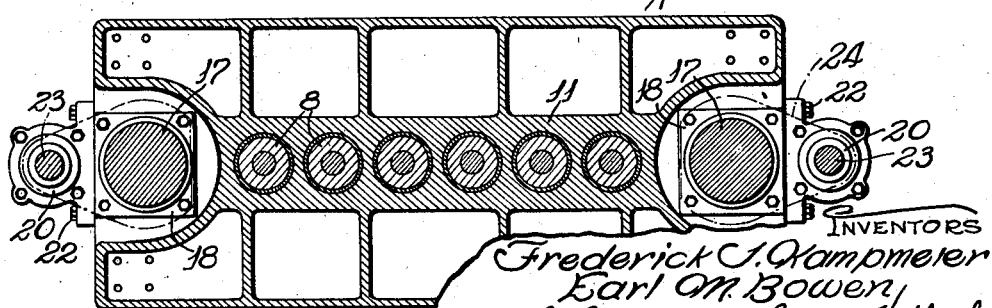

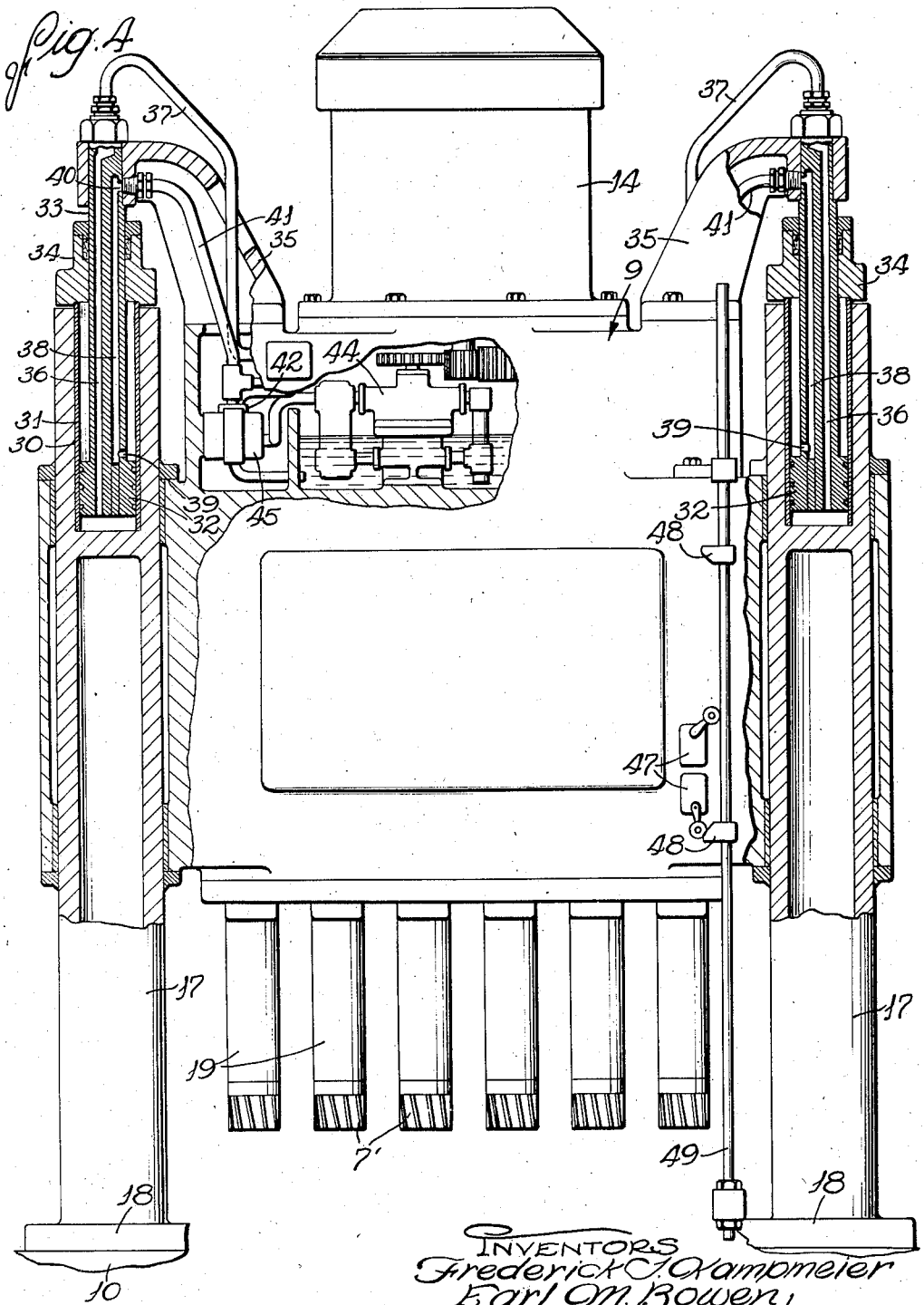

2,273,870

UNITED STATES PATENT OFFICE 2,273,870

MACHINE TOOL

Frederick J. Kampmeier and Earl M. Bowen, Rockford, Ill., assignors to The Ingersoll Milling Machine Company, Rockford, Ill., a corporation of Illinois Application February 10, 1939, Serial No. 255,667

8 Claims. (Cl. 77—63)

This invention relates to machine tools having slidable heads reciprocated by power driven actuators and has more particular reference to machines in which the ways which support the tool head comprise a plurality of posts or bars projecting from and anchored at one end on the fixture or base which supports the work piece during operation of the tools thereon.

One object of the invention is to provide a machine tool of the above general character in which the reactionary forces of the work on the tools and the actuating force for advancing the tools into the work are directed longitudinally of the ways on which the tool head slides and balanced relative to these ways in a novel manner such as to avoid subjecting the posts on which the tool head slides to objectional lateral or bending forces.

The invention also resides in the novel arrangement of the power actuator for reciprocating the tool head so as to obtain the desired balanced condition of the actuating force.

Another object is to provide a machine tool of the above character having a plurality of power driven head actuators alined with or incorporated in the posts on which the head slides.

Other objects and advantages of the invention will become apparent from the following detailed description taken in connection with the accompanying drawings, in which Figure 1 is a perspective view of a multiple spindle embodying the features of the present invention, certain of the parts being broken away and shown in section.

Fig. 2 is a sectional view taken along the line 2—2 of Fig. 1.

Fig. 3 is a fragmentary front elevational view of a modified form of machine tool.

Fig. 4 is a fragmentary front elevational view of another modification, certain of the parts being broken away and others being shown in section.

While the invention is illustrated in the drawings and will be described herein in connection with machine tools for performing certain metal removing operations on a typical work piece, it is applicable to various other metal removing processes and other kinds of machines. It is to be understood, therefore, that we do not intend to limit the invention by the present exemplary disclosures but aim to cover all modifications and alternative constructions falling within the spirit and scope of the invention as expressed in the appended claims.

The machine tools shown in the drawings comprise generally a base or pedestal 5 adapted to rest upon the floor and providing a fixture frame 6 for supporting a work piece in elevated position while it is being operated upon by tools 7 on rotary spindles 8 carried by a reciprocable head 9. The fixture frame is a rigid box-like structure having side walls or posts 10 upstanding from the pedestal and joined by a top plate 11. While being machined, the work piece, which may for example be the engine block of an internal combustion engine, is mounted in the fixture frame on a support 13 and clamped between the latter and the top plate. Herein, there are a plurality of tool spindles arranged in a line and the tools are adapted to operate simultaneously on a series of cylinders of the work piece. In the machine shown in Fig. 1, the tools 7 are adapted to chamfer the ends of the work piece cylinders and the spindles 8 are guided in bushings 12 in the top plate 11. Figs. 3 and 4 show a cylinder boring machine in which tools 7' are fast on spindles 8' rotatable in sleeves 19 projecting from the head 9.

The head 9 comprises a hollow casting housing the speed reduction gearing by which the spindles 8 are driven from an electric motor 14. To support the head from the fixture frame and thereby avoid the necessity of a column, extension 15 on opposite sides of the head casting are internally bored to provide internal way surfaces 16 disposed at opposite ends of the row of spindles and having their axes extending parallel to and disposed in a plane common to the spindle axes. Projecting through and slidable in the bores 16 are posts or rods 17 having machined external surfaces and forming guideways for the tool head. At their lower ends, the rods are anchored on the fixture frame and for this purpose may be formed with feet 18 bolted to the top plate 11.

In accordance with the present invention, power for feeding the head back and forth along the posts 17 is applied in a manner such as to avoid subjecting the posts 17 to lateral bending stresses that would result in inaccuracies in guiding the tools. To this end, the feeding pressure is applied along a plurality of lines lying substantially in a plane common to the post axes and preferably outside of the posts. The feeding pressure is exerted by pairs of coacting stationary and movable feed elements which, in the present instance, are of the hydraulic type and comprise a stationary cylinder 20 and a piston 21 reciprocable therein. In Fig. 1, opposite ends of the cylinder are clamped by bolts 22 against the side walls 10 of the fixture frame 6 and the piston has a rod 23 projecting from the upper end of the cylinder and attached to the head 9. The connection may be through the medium of an arm 24 formed integral with and projecting laterally and outwardly from the head extensions 15.

Reciprocation of the head back and forth is effected by controlling the flow of pressure fluid selectively to opposite ends of the cylinder from a source of supply such as a motor driven pump (not shown) housed in the machine base 5. Such flow is controlled by the usual valve 25 which may be arranged for actuation by dogs 26 on a vertical rod 27 attached to a bracket 28 on the head 9.

If desired, the two hydraulic actuators may, as shown in Fig. 3, be disposed alongside the head 9. In this case, the cylinders are attached at their lower ends to the feet 18 supporting the posts 17 and the piston rod is bolted to a horizontal arm 29 at the upper end of the head, the axes of the piston and cylinder being in the plane of the posts 17.

Fig. 4 shows a modified construction and arrangement of the coacting feed elements which might be used to advantage where the tool head is of the self-contained type. In this form, the axes of the coacting feed elements of the two pairs coincide with the axes of the posts 17 which, for this purpose are made hollow at least at their upper ends so as to define the cylinders 30 of hydraulic actuators. The cylinders may be lined with sleeves 31 in which reciprocate pistons 32 having rods 33 slidable in stuffing boxes 34 closing the upper ends of the cylinders and bolted to the ends of bracket arms 35 rigid with the head casting.

Preferably, each rod 33 and its piston are drilled to provide a longitudinal passage 36 extending the full length of the rod and piston so as to open into the head end of the cylinder 30 and communicate at its upper end with a conduit 37. A second passage 38 within the rod 33 communicates with the rod end of the cylinder through a hole 39 and through a hole 40 with a conduit 41. The conduits, being movable with the head and piston rod, may be of the rigid type and lead to a valve 42 which controls the flow of fluid to and from opposite ends of the cylinder from a pump 44 carried by the head and driven by the tool drive motor 14. To define the cycle of movement of the head, the valve 42 may be actuated by solenoids, one of which is shown at 45, energized under the control of switches 47 which are carried by the head and operated by dogs 48 on a stationary rod 49. When the valve is conditioned to admit fluid to the head end of the cylinder through the conduit 37 and the passage 36 and connect the conduit 41 to the drain, the head 9 will be raised. In the reverse position of the valve, fluid will flow into the rod end of the cylinder through the conduit 41 and the passage 38 and out of the head end through the passage 36 and the conduit 37, the head being retracted.

By employing pairs of coacting feed elements arranged in the manner above described with their axes falling substantially in a plane which includes the axes of the guideways formed by the posts 17 as well as the line of action of the resultant force due to the reaction of the tools on the work, it will be apparent that the forces on the posts 17 will be balanced and will act in the direction of the lengths of the posts. Thus, even though the overhanging ends of the posts are not supported laterally, no objectionable lateral bending stresses will be applied to the posts and the accuracy of the tool movements will not be affected in spite of the severe endwise force applied to the head during certain machining operations. As a result, the posts constitute a simple and inexpensive means for effecting accurate guiding of the tool head during engagement of the tools and the work. Since these guides may be attached directly to the frame of the work fixture, the necessity of columns or other frame structures is avoided and the cost of the machine tool as a whole is reduced accordingly.

We claim as our invention:

1. A machine tool having, in combination, a plurality of posts rigidly supported from one of their ends, a tool head having internal way surfaces receiving and slidable on said posts, a plurality of fluid pressure actuators each comprising coacting piston and cylinder elements one rigid with one of said posts, the other being connected to and movable with said head, and power actuated means for delivering pressure fluid to opposite ends of each cylinder element.

2. A machine tool having, in combination, a plurality of posts rigidly supported from one of their ends, a tool head having internal way surfaces receiving and slidable on said posts, coacting piston and cylinder elements, one rigid with one of said posts, and the other being connected to said head for movement therewith, a power driven pump mounted on said head, and connections through which fluid from said pump may be delivered to opposite ends of said cylinder element.

3. A machine tool having, in combination, a plurality of posts rigidly supported from one of their ends, a tool head having internal way surfaces receiving and slidable on said posts, a cylinder within one of said posts, a piston reciprocable within said cylinder, a rod for said piston projecting from the end of the post and connected to said head, said rod having passages therethrough in constant communication with opposite ends of said cylinder, a power driven pump on said head, and conduits carried by said head through which pressure fluid from said pump may be directed into either of said passages.

4. A machine tool having, in combination, a plurality of posts, a machine tool element having internal way surfaces slidable on said posts, a cylinder within one of said posts, a piston reciprocable in said cylinder, a rod for said piston connected to said element and having passages therethrough communicating with opposite ends of said cylinder, a power driven pump movable with said element, and means for conducting pressure fluid from said pump to said passages.

5. A machine tool having, in combination, a plurality of posts, a machine tool element slidable on the external surfaces of said posts, a cylinder within one of said posts, a piston reciprocable within said cylinder, and means movable with said element and operable to supply pressure fluid to said cylinder on opposite sides of said piston 6. A machine tool having, in combination, a plurality of posts, a machine tool element slidable on the external surfaces of said posts, a cylinder within one of said posts, a piston reciprocable within said cylinder, and means for supplying pressure fluid to opposite ends of said cylinder.

7. A machine tool having, in combination, a tubular member having an external way surface, a machine tool element guided by said member and slidable along said surface, a reciprocable piston disposed within said member and connected to said element, and means for applying fluid pressure to said piston to move said element along said surface.

8. A machine tool having, in combination, a tubular member having an external way surface, a machine tool element guided by said member and slidable along said surface, and an hydraulic actuator for said element having coacting parts reciprocable relative to each other along the axis of said member.

FREDERICK J. KAMPMEIER.
EARL M. BOWEN.